(12) United States Patent
Shibata et al.

(10) Patent No.: US 9,219,443 B2
(45) Date of Patent: Dec. 22, 2015

(54) MOUNTING FOR SOLAR CELL PANEL

(75) Inventors: Haruhiro Shibata, Osaka (JP); Takashi Aotani, Osaka (JP); Yoshihito Nakajima, Osaka (JP)

(73) Assignee: Nissei Metals Co., Ltd., Osaka-shi, Osaka (JP)

( * ) Notice: Subject to any disclaimer, the term of this patent is extended or adjusted under 35 U.S.C. 154(b) by 0 days.

(21) Appl. No.: 14/406,272

(22) PCT Filed: Jul. 10, 2012

(86) PCT No.: PCT/JP2012/067561
§ 371 (c)(1),
(2), (4) Date: Dec. 8, 2014

(87) PCT Pub. No.: WO2014/010026
PCT Pub. Date: Jan. 16, 2014

(65) Prior Publication Data
US 2015/0135608 A1      May 21, 2015

(51) Int. Cl.
*E04B 2/82* (2006.01)
*E04D 13/18* (2014.01)
(Continued)

(52) U.S. Cl.
CPC .............. *H02S 20/23* (2014.12); *F24J 2/5233* (2013.01); *F24J 2/5235* (2013.01); *F24J 2/5249* (2013.01); *H02S 20/24* (2014.12); *F24J 2002/522* (2013.01); *Y02B 10/12* (2013.01)

(58) Field of Classification Search
CPC ......... Y02E 10/47; Y02E 10/50; Y02E 10/40; Y02B 10/12; F24J 2/5258; F24J 2/5245; F24J 2/5264; F24J 2/5249; F24J 2/5211; F24J 2/5203; F24J 2/5239; F24J 2/526; F24J 2/5256; F24J 2/5235; F24J 2002/522; H02S 20/00; H02S 20/23; H02S 20/24; F16B 9/023

USPC ............................................. 52/126.1, 173.3
See application file for complete search history.

(56) References Cited

U.S. PATENT DOCUMENTS 8,250,829 B2 * 8/2012 McPheeters et al. ........... 52/710
8,505,864 B1 * 8/2013 Taylor et al. .................. 248/237
(Continued)

FOREIGN PATENT DOCUMENTS

| JP | 2002-30773 A  | 1/2002  |
|----|---------------|---------|
| JP | 2002-180609 A | 6/2002  |
| JP | 2011-236611 A | 11/2011 |

OTHER PUBLICATIONS

International Search Report for Application No. PCT/JP2012/067561, dated Oct. 16, 2012, with English-language translation.

*Primary Examiner* — Syed A Islam
*Assistant Examiner* — Omar Hijaz
(74) *Attorney, Agent, or Firm* — Kilyk & Bowersox, P.L.L.C.

(57) ABSTRACT

A solar panel mounting for installing a solar cell panel on a folded-plate roof. The mounting includes a metal foundation fixedly attachable to a ridge of the folded-plate roof, a plurality of first brackets including a foundation-side-bracket and a panel-side-bracket, a base of elongated shape, and a mounting bracket to mount the foundation-side-bracket and the panel-side-bracket on the base. The first brackets each include a first coupling portion and a first triangular portion. The first triangular portion is of generally triangular shape including a hypotenuse portion and extends perpendicularly from the first coupling portion. The first coupling portion of the foundation-side-bracket is coupled to the metal foundation. The first coupling portion of the panel-side-bracket is configured to support a solar cell panel. The foundation-side-brackets and the panel-side-brackets are located on top of the metal foundation such that the hypotenuse portions are in contact with each other.

14 Claims, 8 Drawing Sheets

(51) Int. Cl.
  *H02S 20/23*  (2014.01)
  *H02S 20/24*  (2014.01)
  *F24J 2/52*  (2006.01)

(56) References Cited

U.S. PATENT DOCUMENTS

| | | | |
|---|---|---|---|
| 8,640,401 B2 * | 2/2014 | Hong et al. | 52/173.3 |
| 8,756,870 B2 * | 6/2014 | Teller et al. | 52/24 |
| 8,875,401 B2 * | 11/2014 | Jolley | 29/897.312 |
| 8,915,036 B2 * | 12/2014 | Vander Laan et al. | 52/520 |
| 9,010,043 B2 * | 4/2015 | Kanczuzewski et al. | 52/173.3 |
| 2003/0070368 A1 * | 4/2003 | Shingleton | 52/173.3 |
| 2013/0133275 A1 * | 5/2013 | Bindschedler et al. | 52/173.3 |
| 2013/0319962 A1 * | 12/2013 | Park et al. | 211/41.1 |
| 2014/0102016 A1 * | 4/2014 | Hemingway | 52/173.3 |

* cited by examiner

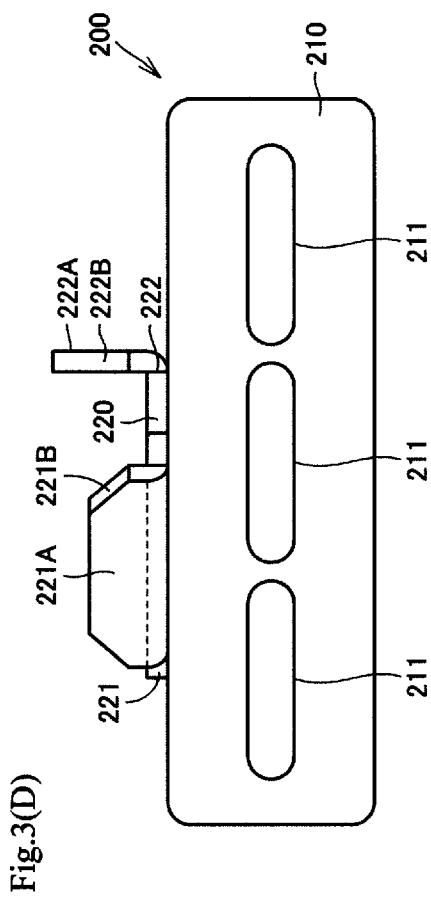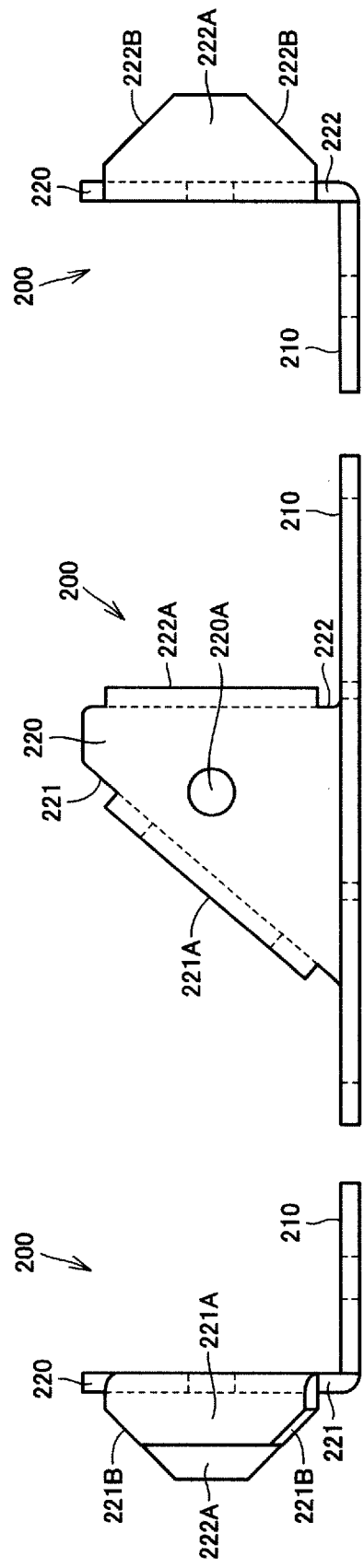

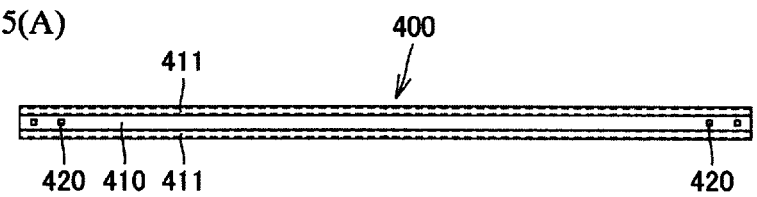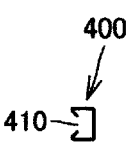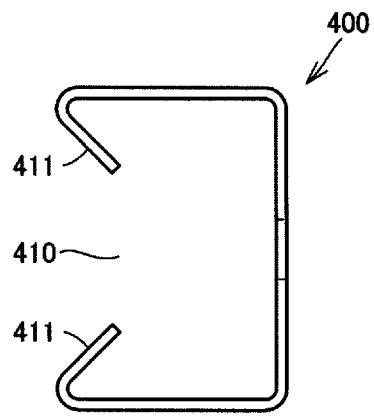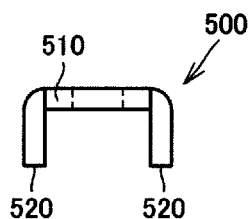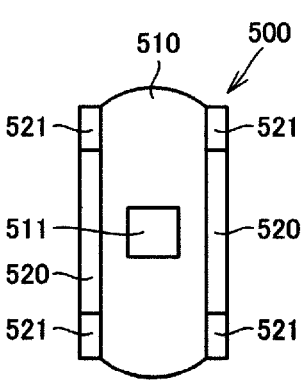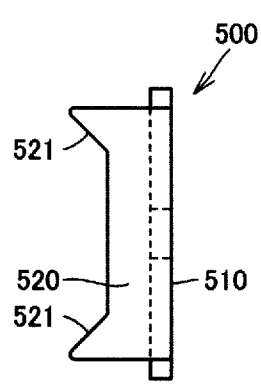

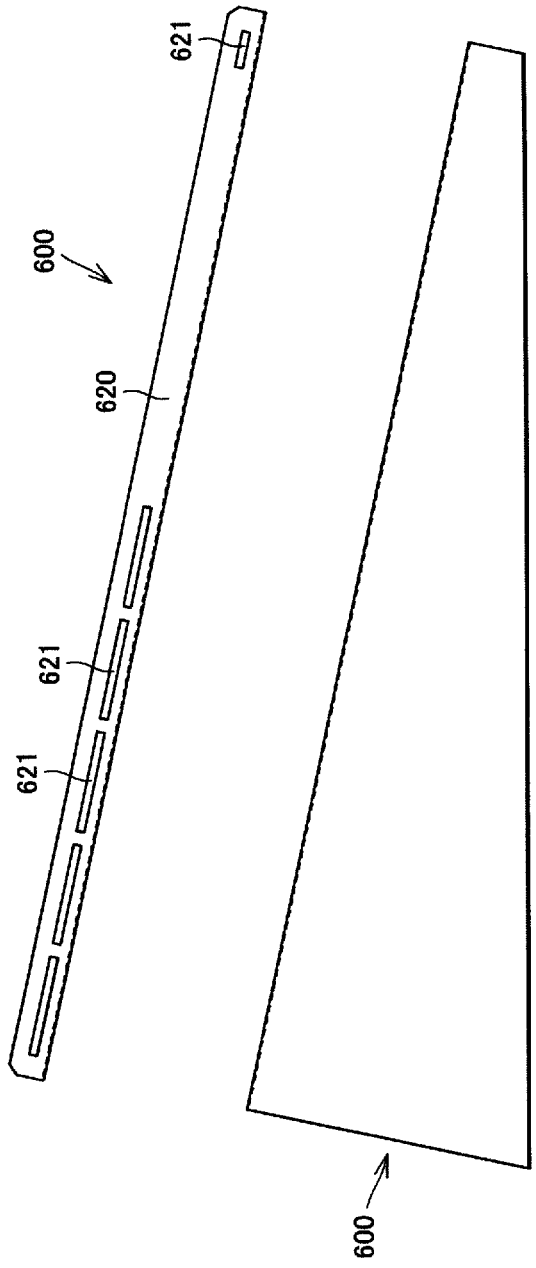
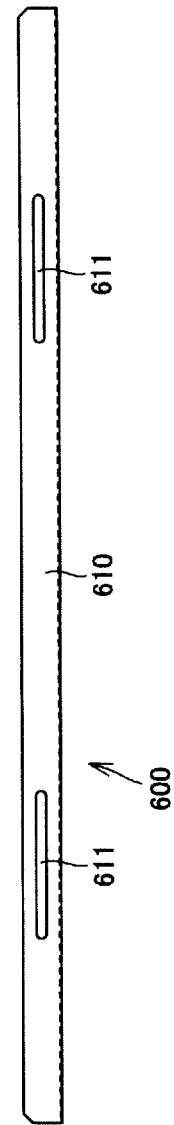
Fig.8(C)
Fig.8(A)
Fig.8(B)

MOUNTING FOR SOLAR CELL PANEL

TECHNICAL FIELD

The invention relates to solar panel mountings for installing solar cells panels on roofs, more particularly on folded-plate roofs.

BACKGROUND ART

It is often the case with folded-plate roofs that metal foundations are attached to ridges of a folded-plate roof, elongated bases are bridged between the metal foundations, and solar cell panels are attached to the bases.

Foundation-side brackets are attached to the metal foundations, the bases are attached to the foundation-side brackets, panel-side brackets are attached to the bases, and solar cell panels are attached to the panel-side brackets.

Patent Literature 1: Japanese Patent Application Laid-Open (JP-A) No. 2011-236611

SUMMARY OF INVENTION

Technical Problem

Folded-plate roofs are formed by combining panels having ridges at regular intervals and broadly divided into the overlap-type and the seam-type. An overlap-type roof is fabricated by overlapping ridges of adjacent panels, and a seam-type roof is fabricated by combining seams of ridges of adjacent panels. In either type, a folded-plate roof is provided above a plurality of beams for fixing the panels. The interval of the beams is not particularly standardized but typically determined in accordance with the size and the shape of the folded-plate roof.

Metal foundations to be attached to ridges of a folded-plate roof must be attached to points where the beams are present to ensure strength. With regard to panel-side brackets to couple solar cell panels to the bases that are bridged between the metal foundations by means of the foundation-side brackets, it is preferable in terms of strength that the panel-side brackets be located above the metal foundations.

In the circumstances in view of various beam intervals, it is desirable that the foundation-side brackets and the panel-side brackets are slidable relative to the bases so as to locate the foundation-side brackets and the panel-side brackets on top of the metal foundations as much as possible.

However, it is difficult to locate two brackets on top of each metal foundation due to the sizes of the metal foundations, the foundation-side brackets, and the panel-side brackets. This makes it inevitable that the panel-side brackets will be misaligned from above the metal foundations, resulting in that the metal foundations cannot directly bear the weight of the solar cell panels.

Also, the positions to install the beams restrict the positions to install the metal foundations and therefore restrict the positions to install solar cell panels. As a result, depending on the positions and the intervals therebetween to install the beams, the solar cell panels may be installed at increased intervals. That is, there may be an area where solar cell panels are installed at random positions, which may not be optimum positions for electricity generation by the solar cell panels.

The invention has been conceived in view of the above circumstances and aims to provide a solar panel mounting in which a foundation-side bracket and a panel-side bracket can be attached to a base at a position in accordance with a metal foundation, the weight of the solar cell panels can be directly supported by the metal foundation, and the solar cell panels can be installed freely without restriction by the installation location of a beam so as to enhance efficiency in electricity generation.

Solution to Problem

A solar panel mounting related to the invention is a solar panel mounting for installing a solar cell panel on a seam-type folded-plate roof. The mounting includes a metal foundation fixedly attached to a ridge of the folded-plate roof; first brackets, wherein two first brackets are used for each metal foundation; a base of elongated shape to be bridged between the metal foundation and another metal foundation by means of the first brackets; and a mounting bracket to mount the first brackets on the base. The first brackets each include a first coupling portion to be coupled to the metal foundation, and a first triangular portion of generally triangular shape extending perpendicularly from the first coupling portion. Of the two first brackets for each metal foundation, one of the first brackets is attached to the metal foundation, and the other first bracket is attached to the base such that the other first bracket is oriented opposite to the first bracket attached to the metal foundation. The two first brackets are located on top of the metal foundation with hypotenuse portions of the first triangular portions of the two first brackets are in contact with each other.

Another solar panel mounting related to the invention is a solar panel mounting for installing a solar cell panel on an overlap-type folded-plate roof. The mounting includes a metal foundation fixedly attached to a ridge of the folded-plate roof; a first bracket used for each metal foundation; a second bracket used for each metal foundation; a base of elongated shape to be bridged between the metal foundation and another metal foundation by means of the first bracket; and a mounting bracket to mount the first bracket and the second bracket on the base. The first bracket includes a first coupling portion to be coupled to the metal foundation, and a first triangular portion of generally triangular shape extending perpendicularly from the first coupling portion. The second bracket includes a second coupling portion to be coupled to the solar cell panel, and a second triangular portion of generally triangular shape extending perpendicularly from the second coupling portion. The first bracket and the second bracket are located on top of the metal foundation such that a hypotenuse portion of the first triangular portion and a hypotenuse portion of the second triangular portion are in contact with each other.

Effect of the Invention

In the solar panel mounting according to the invention, if used for a seam-type folded-plate roof, two of the first brackets are located on top of each metal foundation. Therefore, the weight of the solar cell panel can be highly stably supported directly by the metal foundations and beams located below the metal foundations.

Further, in the solar panel mounting according to the invention, if used for an overlap-type folded-plate roof, the first bracket and the second bracket are located on top of the metal foundation. Therefore, the weight of the solar cell panel can be highly stably supported directly by the metal foundations and beams located below the metal foundations.

Further, in the solar panel mounting according to the invention, irrespective of the seam-type or the overlap-type, the first bracket and the second bracket can be attached to the base at a position in accordance with the metal foundation. Therefore, the metal foundations can be mounted in accordance with the positions of beams, and the first brackets and the second brackets to support the weight of the solar cell panel in conjunction with the metal foundation can be directly supported by the beams by means of the metal foundation, thereby improving the flexibility in mounting the beams and ensuring high stability.

BRIEF DESCRIPTION OF DRAWINGS

FIGS. 3(A) to 3(D) show a second bracket to be used for the solar panel mounting according to the embodiment of the invention, where FIG. 3(A) is a schematic front view, FIG. 3(B) is a schematic right side view, FIG. 3(C) is a schematic left side view, and FIG. 3(D) is a schematic plan view.

FIG. 4(A) is a schematic front view, FIG. 4(B) is a schematic right side view, FIG. 4(C) is a schematic left side view, and FIG. 4(D) is a schematic plan view.

FIGS. 5(A) to 5(C) show a base to be used for the solar panel mounting according to the embodiment of the invention, where FIG. 5(A) is a schematic front view, FIG. 5(B) is a schematic right side view, and FIG. 5(C) is a schematic enlarged right side view.

FIGS. 6(A) to 6(C) show an mounting bracket to be used for the solar panel mounting according to the embodiment of the invention, where FIG. 6(A) is a schematic front view, FIG. 6(B) is a schematic right side view, and FIG. 6(C) is a schematic plan view.

FIG. 7(A) is a schematic right side view showing a state where only one of the first brackets (the lower one) is attached to the base, and FIG. 7(B) is a schematic right side view showing a state where the first bracket (the lower one) and another first brackets (the upper one) are attached to the base.

FIGS. 8(A) and 8(C) show a tilt member to be used for the solar panel mounting according to the embodiment of the invention, where FIG. 8(A) is a schematic left side view, FIG. 8(B) is a schematic bottom view, and FIG. 8(C) is a schematic plan view.

DESCRIPTION OF EMBODIMENTS

Figure 1:
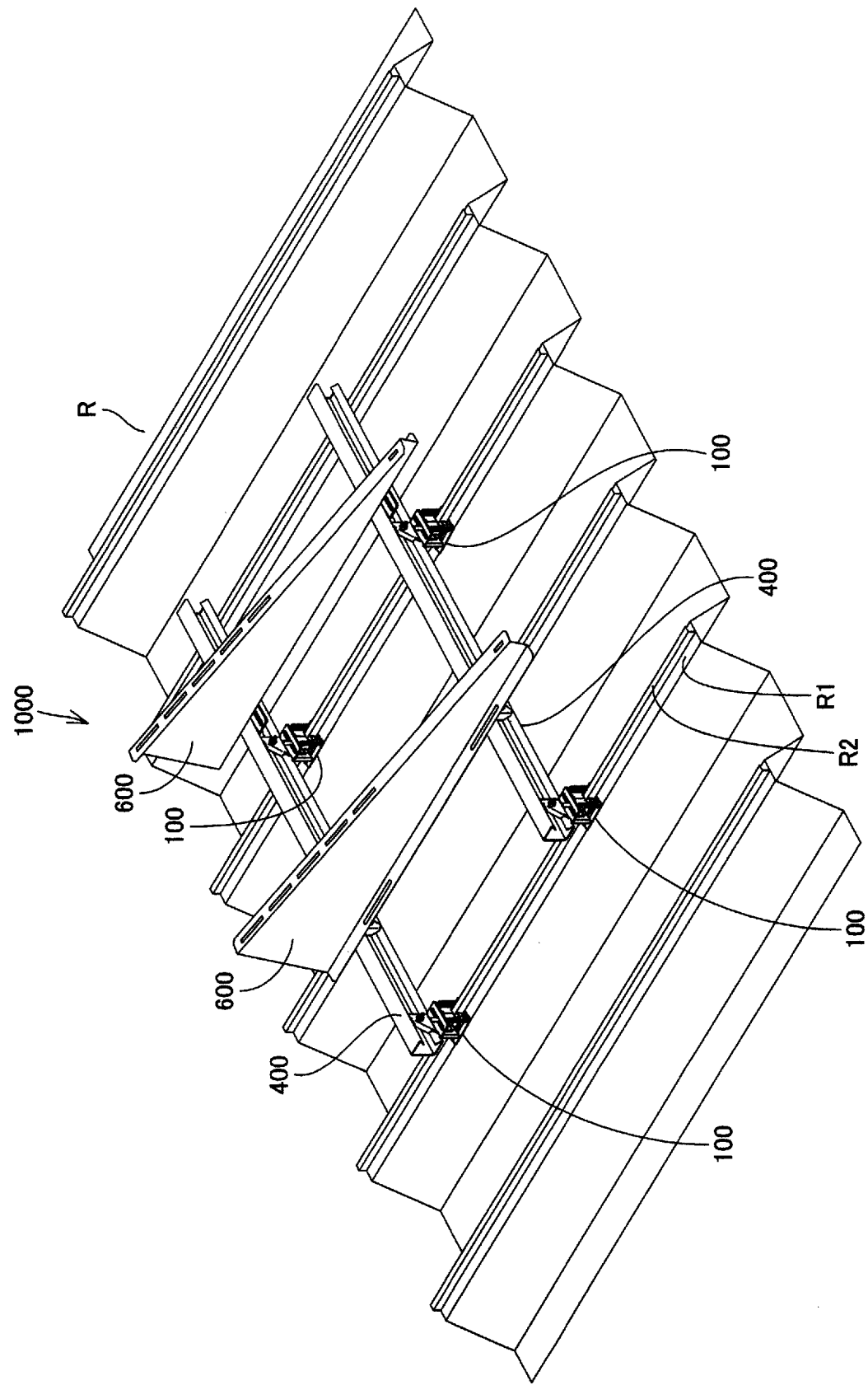
FIG. 1 is a schematic perspective view of a solar panel mounting according to an embodiment of the invention, the mounting being attached to a seam-type folded-plate roof.

A solar panel mounting 1000 according to an embodiment of the invention is a solar panel mounting for installing a solar panel SP on a seam-type folded-plate roof R. The mounting includes metal foundations 100 fixedly attached to ridges of the folded-plate roof, first brackets 300, two of which are used for each metal foundation 100, bases 400 of elongated shape each bridged between a metal foundation 100 and another metal foundation 100 by means of the first brackets 300, and mounting brackets 500 for attaching the first brackets 300 to the bases 400. The first brackets 300 each include a first coupling portion 310, connected to a metal foundation 100, and a first triangular portion 320 in generally triangular shape, extending perpendicularly from the first coupling portion 310. Of the two first brackets 300 for each metal foundation 100, one is attached to the metal foundation 100. The other first bracket 300 is attached to the base 400 such that the other first bracket 300 is oriented opposite to the one of the first brackets 300 attached to the metal foundation 100. The two first brackets 300 are located on top of the metal foundation 100 such that the hypotenuse portions 321 of the first triangular portions 320 of the two first brackets 300 are in contact with one another.

A solar panel SP can be attached using the solar panel mounting 1000 on a folded-plate roof R, irrespective of the seam-type or the overlap-type, with the metal foundations 100 attached to the ridges R1 of the roof. However, the metal foundations 100 of different shapes are used for the seam-type roof and the overlap-type.

Specifically, for the seam-type, the metal foundations 100 are attached to the ridges R1 such that each metal foundation 100 sandwiches a seam R2 formed on each ridge R1.

Figure 9:
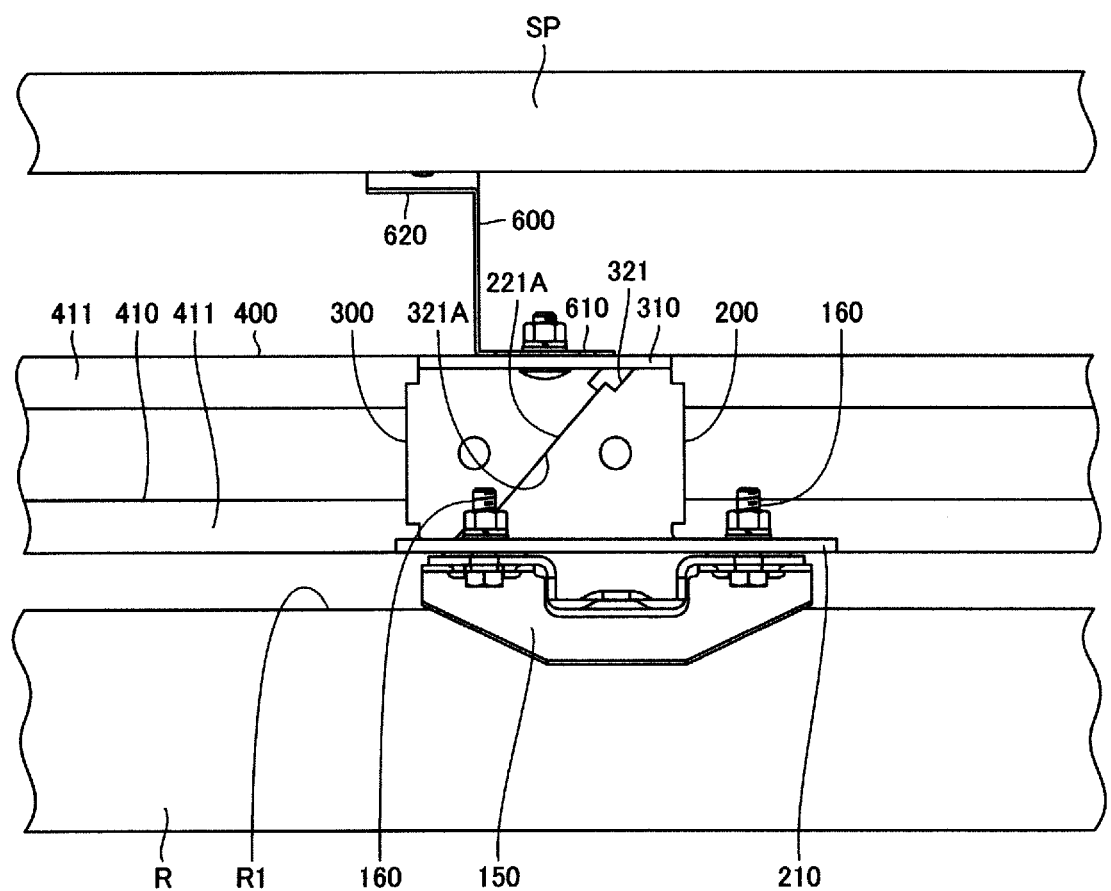
FIG. 9 is a schematic front view of the essential part of the solar panel mounting according to another embodiment of the invention.

For the overlap-type, as shown in FIG. 9, the metal foundations 100 are attached to the ridges R1 by using bolts (not shown). The bolts stand relative to the beams (not shown) below the folded-plate roof R and pass through the ridges R1.

In either case, the top of each metal foundation 100 is provided with bolts (not shown) projecting for fixing a foundation-side bracket 300.

The first brackets 300 are formed by bending an iron plate. As shown in FIGS. 4(A) to 4(D), each first bracket 300 includes the first coupling portion 310 in rectangular shape and the first triangular portion 320 in substantially regular triangular shape bent and raised perpendicularly to the first coupling portion 310.

In the solar panel mounting 1000, two of the first brackets 300 are used for each metal foundation 100.

The first brackets 300 may be formed by die-casting zinc or aluminum as long as they can ensure adequate strength.

Each first coupling portion 310 has one elongated hole 311. The elongated hole 311 receives the bolt therethrough.

The first triangular portion 320 is joined at its bottom to the first coupling portion 310. In the first triangular portion 320, the hypotenuse portion 321 and the perpendicular-leg portion 322, which is perpendicular to the first coupling portion 310, are formed with bent portions 321A and 322A, respectively, which are bent to extend in the opposite direction to the first coupling portion 310. The bent portions 321A and 322A are generally trapezoidal. Oblique sides 321B and 322B of the bent portions 321A and 322A are to be brought into intimate contact with a slope 411 of the base 400.

The first triangular portion 320 also has a first through-hole 320A substantially in the center. The first through-hole 320A is used to receive therethrough a bolt 700 for fixing a first bracket 300 to the base 400.

As shown in FIGS. 5(A) to 5(C), the base 400 is in square tuboid shape, one side of which has a groove 410. The one side with the groove 410 is bent inwardly to form the slopes 411.

The base 400 can be extended with joints (not shown). For this purpose, bolt holes 420 for connecting the joints to the base 400 are open at opposite ends of the face of the base 400 that is opposed to the one side face formed with the groove 410.

The mounting bracket 500 to attach the first bracket 300 to the base 400 includes a midsection 510 and retainers 520 integrally formed as shown in FIGS. 6(A) to 6(C). The center of the midsection 510 has a bolt hole 511. The retainers 520 are flat and U-shaped portions extending perpendicularly from the opposite sides of the midsection 510. The retainers 520 are each formed with inclined portions 521.

Figure 7A:
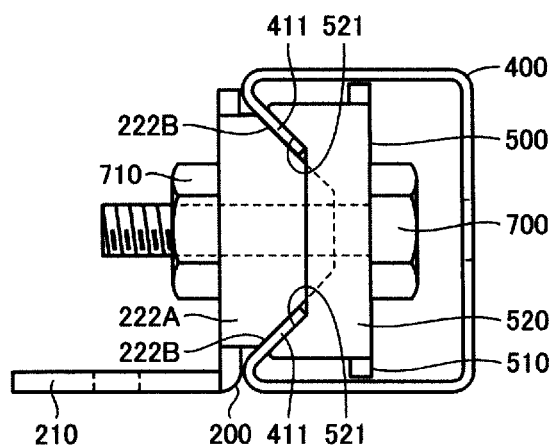
FIGS. 7(A) and 7(B) show a state in which two first brackets are attached to the base in the solar panel mounting according to the embodiment of the invention, where
Figure 7B:
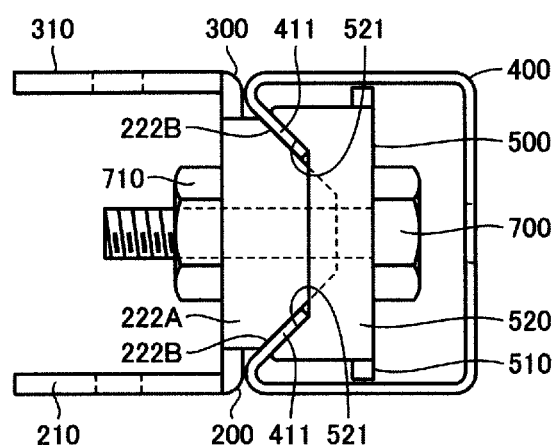

As shown in FIG. 7, the mounting bracket 500 is used to attach the first bracket 300 to the base 400 with the first coupling portion 310 joined to the metal foundation 100.

The oblique sides 321B and 322B of the bent portions 321A and 322A of the first bracket 300 are brought into intimate contact with the front faces of the slopes 411 of the base 400. The mounting bracket 500 is placed into the base 400 so that the inclined portions 521 of the retainers 520 of the mounting bracket 500 are brought into abutment with the back faces of the slopes 411. In that state, the bolt 700 is passed through the bolt hole 511 of the mounting bracket 500 and a first through-hole 320A of the first bracket 300, and the bolt 700 is threadedly engaged with a nut 710. The first bracket 300 is thus attached to the base 400.

It should be noted that the first coupling portion 310 of the first bracket 300 is flush with the lower side of the base 400.

Figure 2:
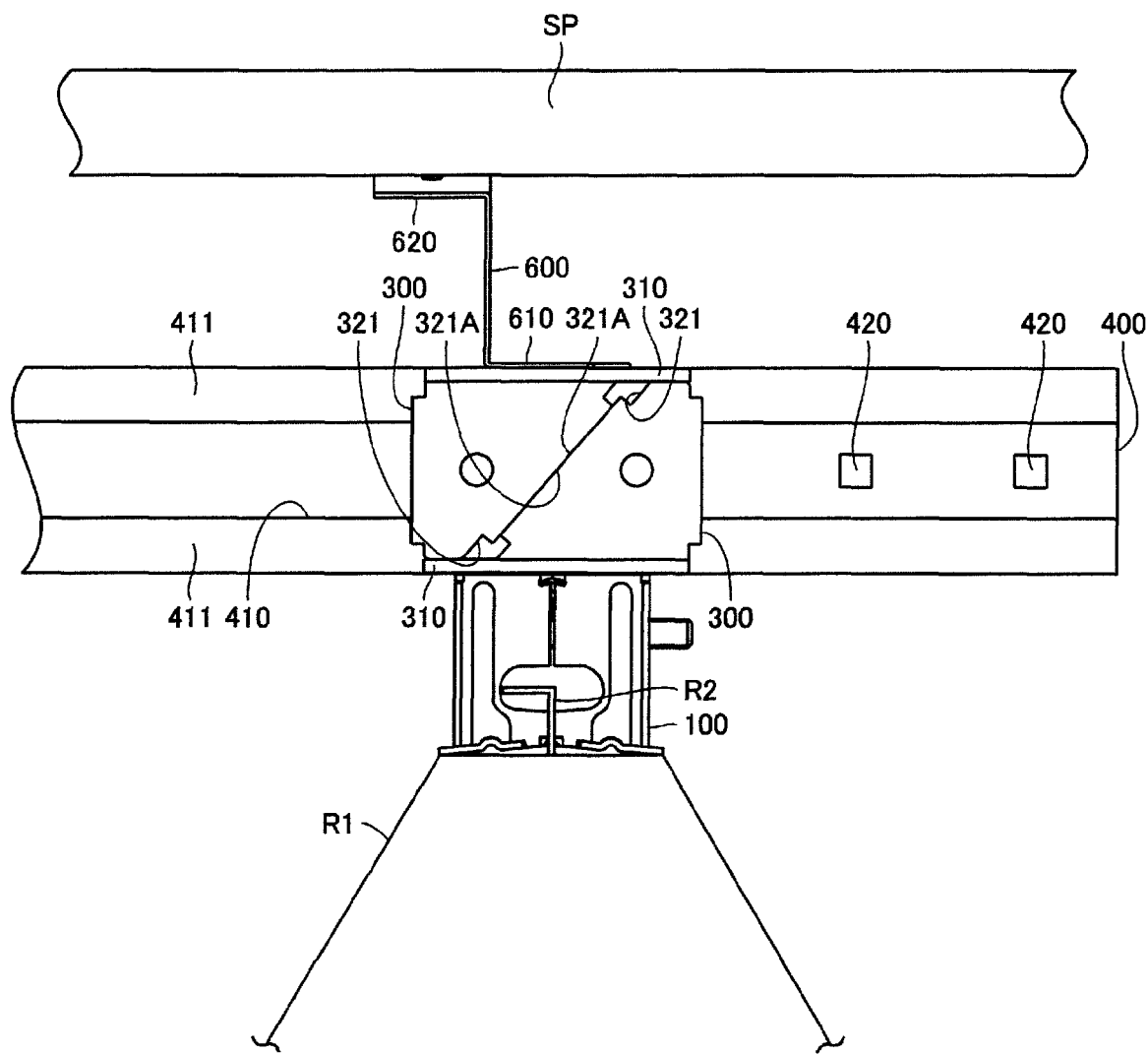
FIG. 2 is a schematic front view of the essential part of the solar panel mounting according to the embodiment of the invention.
Figure 4B:
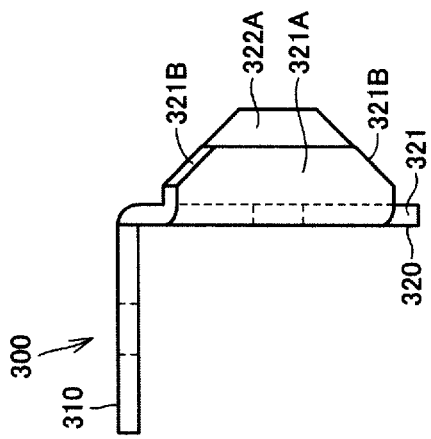
FIGS. 4(A) to 4(D) show a first bracket to be used for the solar panel mounting according to the embodiment of the invention, where
Figure 4D:
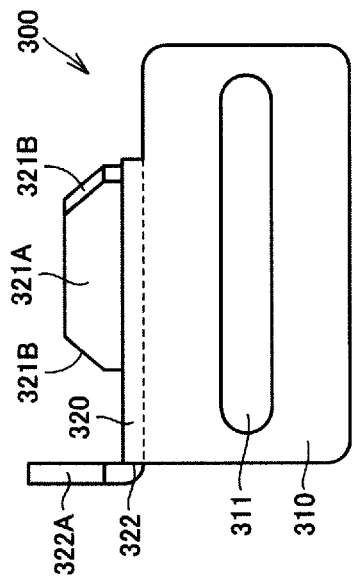
Figure 4A:
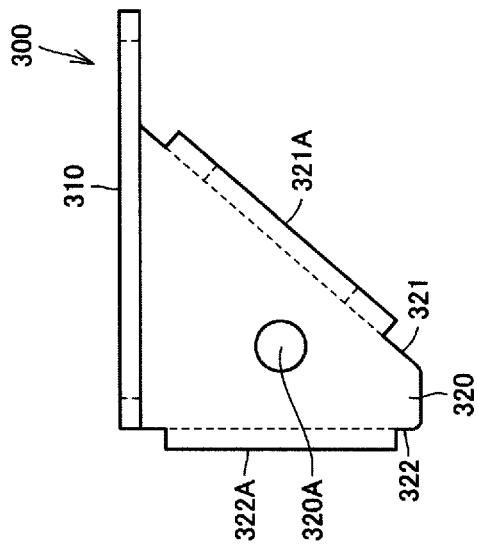
Figure 4C:
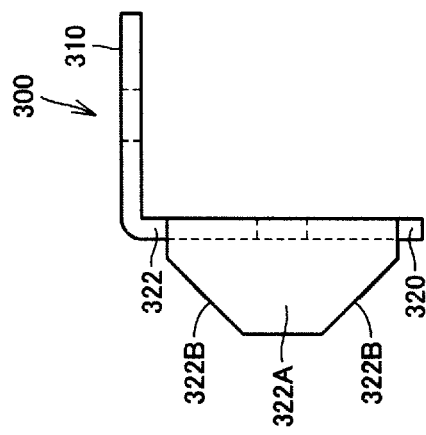

Next, a second one of the first brackets 300 (the upper one of the first brackets 300 as shown in FIG. 2) is attached to the base 400 using the mounting bracket 500 in a similar manner to the first bracket 300 described above but in the opposite orientation thereto.

It should also be noted that the first coupling portion 310 of the second one of the first brackets 300 is flush with the upper side of the base 400.

As shown in FIG. 2, one of the first brackets 300 is attached to the metal foundation 100, the other first bracket 300 is attached to the base 400. The bent portion 321A of the hypotenuse portion 321 of the first bracket 300 on the metal foundation 100 side is brought into contact with the bent portion 321A of the hypotenuse portion 321 of the other first bracket 300 in inverted orientation, so that the two first brackets 300 are located on top of the metal foundation 100. This also joins the base 400 to the metal foundation 100.

In FIG. 2, a tilt member 600 is attached to the first coupling portion 310 of the upper first bracket 300 so as to be interposed between this first coupling portion 310 and a solar panel SP.

If the folded-plate roof R itself is tilted at an angle suitable for electricity generation by the solar panel SP, then the solar panel SP can be connected directly to the first coupling portion 310 of the upper first bracket 300.

If unfortunately the folded-plate roof R itself is horizontally oriented or tilted at an angle that is not suitable for electricity generation by the solar panel SP, instead of connecting the solar panel SP directly to the first coupling portion 310 of the upper first side bracket 300, the tilt member 600 is interposed between the upper first bracket 300 and the solar panel SP as shown in FIG. 1.

As shown in FIG. 8, the tilt member 600 is formed by bending an iron plate into elongated triangular shape and is attached in bridging manner between two bases 400. To this end, the lower edge of the tilt member 600 is bent to form a lower mounting face 610 having two elongated attachment holes 611 for attaching the tilt member 600 to the upper first bracket 300, and the opposite edge, or upper edge, of the tilt member 600 is bent to form an upper mounting face 620 having a plurality of (six in the drawing) panel attachment holes 621 for attachment of the solar panel SP.

Addition of this tilt member 600 makes it possible to mount a solar panel SP at an angle suitable for electricity generation even when a folded-plate roof R itself is horizontally oriented or tilted at an angle not suitable for electricity generation by the solar panel SP.

FIGS. 1 and 2 show the solar panel mounting 1000 attached to a seam-type folded-plate roof R. However, the mounting is obviously mountable not only on a seam-type folded-plate roof but also on an overlap-type folded-plate roof. When the solar panel mounting 1000 is mounted on an overlap-type folded-plate roof, a metal foundation 150 is used that conforms to the overlap-type folded-plate roof, i.e. that of saddle-type to be described.

In addition, when the solar panel mounting 1000 is mounted on an overlap-type folded-plate roof R, one first bracket 300 and one second bracket 200 are used as shown in FIG. 9.

FIG. 9 shows an overlap-type folded-plate roof R, onto the ridge R1 of which the base 400 is mounted. The saddle-type metal foundation 150 straddles and is attached to the ridge R1, and the second bracket 200 is mounted on the metal foundation 150 by means of bolts and nuts 160.

The second bracket 200, formed by bending an iron plate as is the case with the first bracket 300, includes, as shown in FIGS. 3(A) to 3(D), a second coupling portion 210 in rectangular shape and a second triangular portion 220 in substantially regular triangular shape that is bent and raised perpendicularly to the second coupling portion 210.

The second bracket 200 may be formed by die-casting zinc or aluminum as long as it can ensure an adequate strength.

The second bracket 200 and may be formed by die-casting zinc or aluminum as long as it can ensure an adequate strength.

The second coupling portion 210, longer than the first coupling portion 310 of the first bracket 300, has three elongated holes 211. The elongated holes 211 serve to receive therethrough the bolts of the bolts and nuts 160.

The second triangular portion 220 is joined at its bottom to the second coupling portion 210. In the second triangular portion 220, the hypotenuse portion 221 and the perpendicular-leg portion 222, which is perpendicular to the second coupling portion 210, are formed with bent portions 221A and 222A, respectively, which are bent to extend in the opposite direction to the second coupling portion 210. The bent portions 221A and 222A are generally of trapezoidal shape. The oblique sides 221B and 222B of the bent portions 221A and 222A are to be brought into intimate contact with the slopes 411 of the base 400.

The second triangular portion 220 also has the second through-hole 220A substantially in the center. The second through-hole 220A is used to receive therethrough the bolt 700 for fixing the second bracket 200 to the base 400.

The hypotenuse portion 321 of the first bracket 300 and the hypotenuse portion 221 of the second bracket 200 are inclined at the same angle. Accordingly, when the hypotenuse portion 321 of the first bracket 300 is brought into abutment against the hypotenuse portion 221 of the second bracket 200, the hypotenuse portions 321 and 221, more particularly the bent portions 321A and 221A formed on the hypotenuse portions 321 and 221, are brought into intimate contact with each other.

In FIG. 9, a solar panel SP is mounted via the tilt member 600. However, if the folded-plate roof R itself is tilted at an angle suitable for electricity generation by the solar panel SP, then the solar panel SP can be connected directly to the first coupling portion 310 of the first bracket 300 without using the tilt member 600. This is the same as in the case of attaching a solar panel SP to a seam-type folded-plate roof R as described above.

REFERENCE SIGNS LIST

100: Metal foundation
300: First bracket

310: First coupling portion
320: First triangular portion
321: Hypotenuse portion (of the first triangular portion)
200: Second bracket
210: Second coupling portion
220: Second triangular portion
221: Hypotenuse portion (of the second triangular portion)
400: Base
500: Mounting bracket
1000: Solar panel mounting
R: Folded-plate roof
SP: Solar cell panel

The invention claimed is:

1. A solar panel mounting for installing a solar cell panel on a seam-type folded-plate roof, the mounting comprising:
   a metal foundation fixedly attachable to a ridge of the folded-plate roof;
   a plurality of first brackets including a foundation-side-bracket and a panel-side-bracket, the first brackets each comprising:
      a first coupling portion, and
      a first triangular portion of generally triangular shape including a hypotenuse portion, the first triangular portion extending perpendicularly from the first coupling portion, the hypotenuse portion having a sloped surface,
      the first coupling portion of the foundation-side bracket being coupled to the metal foundation,
      the first coupling portion of the panel-side bracket being configured to support a solar cell panel,
   a base of elongated shape; and
   a mounting bracket to mount the foundation-side bracket and the panel-side bracket on the base, wherein
   the metal foundation, the foundation-side bracket, and the panel-side bracket being stacked, in order, in a stacking direction, and
   the sloped surfaces of the hypotenuse portions of the first triangular portions of the foundation-side and panel-side brackets are in surface contact with each other such that the first triangular portions of the foundation-side and panel-side brackets are arranged in opposite orientation to each other in the stacking direction.

2. The solar panel mounting according to claim 1, further comprising a tilt member to be attached to the first coupling portion of the panel-side bracket, the tilt member being configured to be interposed between the first coupling portion of the panel-side bracket and the solar cell panel.

3. The solar panel mounting according to claim 1, wherein
   the hypotenuse portion of each of the first triangular portions includes a first bent portion bent so as to extend in an opposite direction to the first coupling portion, the first bent portion including the sloped surface, and
   the sloped surfaces of the first bent portions of the hypotenuse portions of the first triangular portions of the foundation-side and panel-side brackets are in surface contact with each other such that the first triangular portions of the foundation-side and panel-side brackets are arranged in opposite orientation to each other in the stacking direction.

4. A solar panel mounting for installing a solar cell panel on a seam-type folded-plate roof, the mounting comprising:
   a metal foundation fixedly attachable to a ridge of the folded-plate roof;
   a plurality of first brackets including a foundation-side bracket and a panel-side bracket, the first brackets each comprising:
      a first coupling portion, and
      a first triangular portion of generally triangular shape including a hypotenuse portion, the first triangular portion extending perpendicularly from the first coupling portion,
      the first coupling portion of the foundation-side bracket being coupled to the metal foundation,
      the first coupling portion of the panel-side bracket being configured to support a solar cell panel, and
      the foundation-side bracket being located on top of the metal foundation and the panel-side bracket being located on top of the foundation-side bracket such that the hypotenuse portions of the first triangular portions of the foundation-side and panel-side brackets are in contact with each other;
   a base of elongated shape; and
   a mounting bracket to mount the foundation-side bracket and the panel-side bracket on the base, wherein
   the base is a square tuboid and includes:
      a groove extending in a longitudinal direction of the base, and
      a pair of sloped portions extending on either side of the groove and sloping inwardly of the base, the sloped portions each including an outer face and an inner face,
   the first triangular portions each include:
      the hypotenuse portion, and
      a perpendicular-leg portion extending perpendicularly to the first coupling portion,
   the hypotenuse portion of each of the first triangular portions includes a first bent portion generally of trapezoidal shape, the first bent portion being bent so as to extend in an opposite direction to the first coupling portion and including a pair of oblique sides in intimate contact with the respective outer faces of the sloped portions of the base,
   the perpendicular-leg portion of each of the first triangular portions includes a second bent portion generally of trapezoidal shape, the second bent portion being bent so as to extend in the opposite direction to the first coupling portion and including a pair of oblique sides in intimate contact with the respective outer faces of the sloped portions of the base, and
   the mounting bracket is disposed inside the base and includes a retainer, the retainer including a pair of inclined portions in intimate contact with the respective inner faces of the sloped portions of the base.

5. The solar panel mounting according to claim 4, further comprising:
   a bolt passing through the mounting bracket and the first triangular portion of one of the first brackets, and
   a nut threadedly engaged with the bolt so as to abut the first triangular portion.

6. A solar panel mounting for installing a solar cell panel on a seam-type folded-plate roof, the mounting comprising:
   a metal foundation fixedly attachable to a ridge of the folded-plate roof;
   a plurality of first brackets including a foundation-side bracket and a panel-side bracket, the first brackets each comprising:
      a first coupling portion, and
      a first triangular portion of generally triangular shape including a hypotenuse portion, the first triangular portion extending perpendicularly from the first coupling portion,
      the first coupling portion of the foundation-side bracket being coupled to the metal foundation, the first coupling portion of the panel-side bracket being configured to support a solar cell panel, and the foundation-side bracket being located on top of the metal foundation and the panel-side bracket being located on top of the foundation-side bracket such that the hypotenuse portions of the first triangular portions of the foundation-side and panel-side brackets are in contact with each other;

a base of elongated shape;

a mounting bracket to mount the foundation-side bracket and the panel-side bracket on the base; and a tilt member to be attached to the first coupling portion of the panel-side bracket, the tilt member being configured to be interposed between the first coupling portion of the panel-side bracket and the solar cell panel, wherein the base is a square tuboid and includes:
- a groove extending in a longitudinal direction of the base, and
- a pair of sloped portions extending on either side of the groove and sloping inwardly of the base, the sloped portions each including an outer face and an inner face, the first triangular portions each include:
- the hypotenuse portion, and
- a perpendicular-leg portion extending perpendicularly to the first coupling portion, the hypotenuse portion of each of the first triangular portions includes a first bent portion generally of trapezoidal shape, the first bent portion being bent so as to extend in an opposite direction to the first coupling portion and including a pair of oblique sides in intimate contact with the respective outer faces of the sloped portions of the base, the perpendicular-leg portion of each of the first triangular portions includes a second bent portion generally of trapezoidal shape, the second bent portion being bent so as to extend in the opposite direction to the first coupling portion and including a pair of oblique sides in intimate contact with the respective outer faces of the sloped portions of the base, and the mounting bracket is disposed inside the base and includes a retainer, the retainer including a pair of inclined portions in intimate contact with the respective inner faces of the sloped portions of the base.

7. The solar panel mounting according to claim 6, further comprising:
a bolt passing through the mounting bracket and the first triangular portion of one of the first brackets, and
a nut threadedly engaged with the bolt so as to abut the first triangular portion.

8. A solar panel mounting for installing a solar cell panel on an overlap-type folded-plate roof, the mounting comprising:
a metal foundation fixedly attachable to a ridge of the folded-plate roof;
a first bracket comprising:
  a first coupling portion being configured to support a solar cell panel, and
  a first triangular portion of generally triangular shape including a hypotenuse portion, the first triangular portion extending perpendicularly from the first coupling portion, the hypotenuse portion having a sloped surface,
a second bracket comprising:
  a second coupling portion being coupled to the metal foundation, and
  a second triangular portion of generally triangular shape including a hypotenuse portion, the second triangular portion extending perpendicularly from the second coupling portion, the hypotenuse portion of the second triangular portion having a sloped surface;
a base of elongated shape; and
a mounting bracket to mount the first bracket and the second bracket on the base, wherein
the metal foundation, the second bracket, and the first bracket are stacked, in order, in a stacking direction, and
the sloped surface of the hypotenuse portion of the first triangular portion of the first bracket are in surface contact with the sloped surface of the hypotenuse portion of the second triangular portion of the second bracket such that the first and second triangular portions of the first and second brackets are arranged in opposite orientation to each other in the stacking direction.

9. The solar panel mounting according to claim 8, further comprising a tilt member to be attached to the first coupling portion of the first bracket, the tilt member being configured to be interposed between the first coupling portion and the solar cell panel.

10. The solar panel mounting according to claim 8, wherein
the hypotenuse portion of the first triangular portion includes a first bent portion bent so as to extend in an opposite direction to the first coupling portion, the first bent portion including the sloped surface of the first triangular portion,
the hypotenuse portion of the second triangular portion includes a third bent portion bent so as to extend in an opposite direction to the second coupling portion, the third bent portion including the sloped surface of the second triangular portion, and
the sloped surface of the first bent portion of the hypotenuse portion of the first triangular portion of the first bracket is in surface contact with the sloped surface of the third bent portion of the hypotenuse portion of the second triangular portion of the second bracket such that the second triangular portion of the second bracket is in opposite orientation in the stacking direction to the first triangular portion of the first bracket.

11. A solar panel mounting for installing a solar cell panel on an overlap-type folded-plate roof, the mounting comprising:
a metal foundation fixedly attachable to a ridge of the folded-plate roof;
a first bracket comprising:
  a first coupling portion being configured to support a solar cell panel, and
  a first triangular portion of generally triangular shape including a hypotenuse portion, the first triangular portion extending perpendicularly from the first coupling portion,
a second bracket comprising:
  a second coupling portion being coupled to the metal foundation, and
  a second triangular portion of generally triangular shape including a hypotenuse portion, the second triangular portion extending perpendicularly from the second coupling portion, the second bracket being located on top of the metal foundation and the first bracket being located on top of the second bracket such that the hypotenuse portions of the first and second triangular portions of the first and second brackets are in contact with each other;
a base of elongated shape; and
a mounting bracket to mount the first bracket and the second bracket on the base, wherein the base is a square tuboid and includes:
  a groove extending in a longitudinal direction of the base, and
  a pair of sloped portions extending on either side of the groove and sloping inwardly of the base, the sloped portions each including an outer face and an inner face,
the first triangular portion comprises:
  the hypotenuse portion, and
  a perpendicular-leg portion extending perpendicularly to the first coupling portion,
the hypotenuse portion of the first triangular portion includes a first bent portion generally of trapezoidal shape, the first bent portion being bent so as to extend in an opposite direction to the first coupling portion and including a pair of oblique sides in intimate contact with the respective outer faces of the sloped portions of the base,
the perpendicular-leg portion of the first triangular portion includes a second bent portion generally of trapezoidal shape, the second bent portion being bent so as to extend in the opposite direction to the first coupling portion and including a pair of oblique sides in intimate contact with the respective outer faces of the sloped portions of the base,
the second triangular portion comprises:
  the hypotenuse portion, and
  a perpendicular-leg portion extending perpendicularly to the second coupling portion,
the hypotenuse portion of the second triangular portion includes a third bent portion generally of trapezoidal shape, the third bent portion being bent so as to extend in an opposite direction to the second coupling portion and including a pair of oblique sides in intimate contact with the respective outer faces of the sloped portions of the base,
the perpendicular-leg portion of the second triangular portion includes a fourth bent portion generally of trapezoidal shape, the fourth bent portion being bent so as to extend in the opposite direction to the second coupling portion and including a pair of oblique sides in intimate contact with the respective outer faces of the sloped portions of the base, and
the mounting bracket is disposed inside the base and includes a retainer, the retainer including a pair of inclined portions in intimate contact with the respective inner faces of the sloped portions of the base.

12. The solar panel mounting according to claim 11, further comprising:
a first bolt passing through the mounting bracket and the first triangular portion of the first bracket,
a first nut threadedly engaged with the first bolt so as to abut the first triangular portion,
a second bolt passing through the mounting bracket and the second triangular portion of the second bracket,
a second nut threadedly engaged with the second bolt so as to abut the second triangular portion.

13. A solar panel mounting for installing a solar cell panel on an overlap-type folded-plate roof, the mounting comprising:
a metal foundation fixedly attachable to a ridge of the folded-plate roof;
a first bracket comprising:
  a first coupling portion being configured to support a solar cell panel, and
  a first triangular portion of generally triangular shape including a hypotenuse portion, the first triangular portion extending perpendicularly from the first coupling portion,
a second bracket comprising:
  a second coupling portion being coupled to the metal foundation, and
  a second triangular portion of generally triangular shape including a hypotenuse portion, the second triangular portion extending perpendicularly from the second coupling portion, the second bracket being located on top of the metal foundation and the first bracket being located on top of the second bracket such that the hypotenuse portions of the first and second triangular portions of the first and second brackets are in contact with each other;
a base of elongated shape;
a mounting bracket to mount the first bracket and the second bracket on the base; and
a tilt member to be attached to the first coupling portion of the first bracket, the tilt member being configured to be interposed between the first coupling portion and the solar cell panel, wherein
the base is a square tuboid and includes:
  a groove extending in a longitudinal direction of the base, and
  a pair of sloped portions extending on either side of the groove and sloping inwardly of the base, the sloped portions each including an outer face and an inner face,
the first triangular portion comprises:
  the hypotenuse portion, and
  a perpendicular-leg portion extending perpendicularly to the first coupling portion,
the hypotenuse portion of the first triangular portion includes a first bent portion generally of trapezoidal shape, the first bent portion being bent so as to extend in an opposite direction to the first coupling portion and including a pair of oblique sides in intimate contact with the respective outer faces of the sloped portions of the base,
the perpendicular-leg portion of the first triangular portion includes a second bent portion generally of trapezoidal shape, the second bent portion being bent so as to extend in the opposite direction to the first coupling portion and including a pair of oblique sides in intimate contact with the respective outer faces of the sloped portions of the base,
the second triangular portion comprises:
  the hypotenuse portion, and
  a perpendicular-leg portion extending perpendicularly to the second coupling portion,
the hypotenuse portion of the second triangular portion includes a third bent portion generally of trapezoidal shape, the third bent portion being bent so as to extend in an opposite direction to the second coupling portion and including a pair of oblique sides in intimate contact with the respective outer faces of the sloped portions of the base,
the perpendicular-leg portion of the second triangular portion includes a fourth bent portion generally of trapezoidal shape, the fourth bent portion being bent so as to extend in the opposite direction to the second coupling portion and including a pair of oblique sides in intimate contact with the respective outer faces of the sloped portions of the base, and the mounting bracket is disposed inside the base and includes a retainer, the retainer including a pair of inclined portions in intimate contact with the respective inner faces of the sloped portions of the base.

14. The solar panel mounting according to claim 13, further comprising:
   a first bolt passing through the mounting bracket and the first triangular portion of the first bracket,
   a first nut threadedly engaged with the first bolt so as to abut the first triangular portion,
   a second bolt passing through the mounting bracket and the second triangular portion of the second bracket,
   a second nut threadedly engaged with the second bolt so as to abut the second triangular portion.

* * * * *